Aug. 31, 1926.  
O. W. A. OETTING  
STORAGE BATTERY  
Filed May 12, 1922  
1,598,218

Inventor  
Oscar W. A. Oetting  
by Thurston Kwin & Hudson  
attys.

Patented Aug. 31, 1926.

1,598,218

UNITED STATES PATENT OFFICE.

OSCAR W. A. OETTING, OF EAST CLEVELAND, OHIO, ASSIGNOR TO WILLARD STORAGE BATTERY COMPANY, OF CLEVELAND, OHIO, A CORPORATION OF WEST VIRGINIA.

STORAGE BATTERY.

Application filed May 12, 1922. Serial No. 560,407.

This invention relates to storage batteries and is an improvement over the constructions shown in the patent of Theodore A. Willard, No. 1,515,453, Nov. 11, 1924, and in the application of Rudolph C. Norberg, Serial No. 556,260, filed April 24, 1922.

In general, the object of the invention is to provide a battery which though not necessarily confined to radio work, is especially adapted therefor, inasmuch as the construction is such that each cell can be formed in small size, with the parts compactly arranged, and can be produced inexpensively and in quantities. The improvements over the construction shown in the Willard and Norberg applications referred to above, are such as to decrease the cost, and at the same time to improve the operation or efficiency of the battery.

Figure 1:
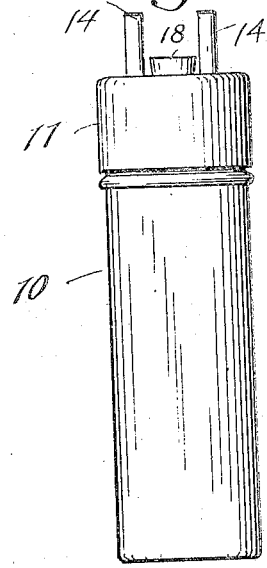
Figure 2:
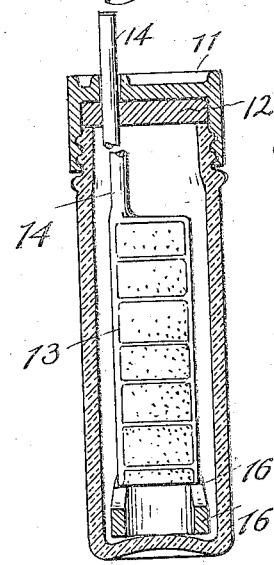
Figure 3:
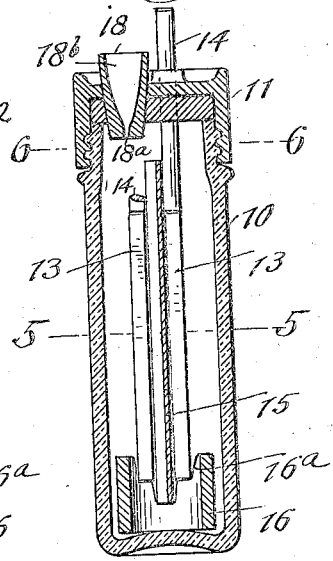
Figure 4:
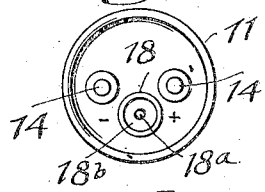
Figure 5:
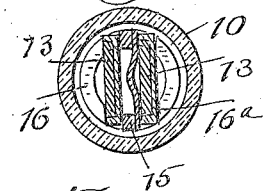
Figure 6:
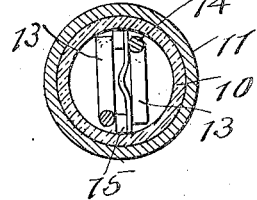
Figure 7:
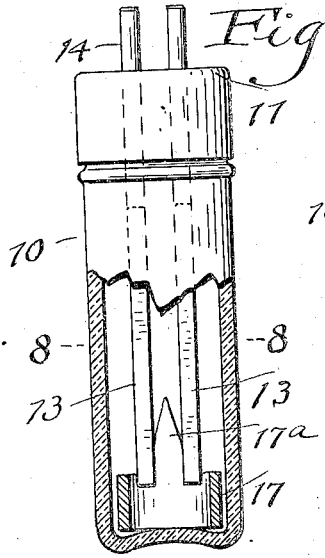
Figure 8:
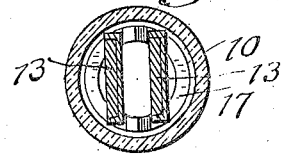
Figure 9:
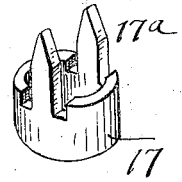

The improvements reside in the individual cells of the battery, any number of which can be grouped together to form a battery of the desired voltage, and in the drawings wherein I have shown one cell only, Fig. 1 is a side view of the cell; Figs. 2 and 3 are vertical sectional views with the section of Fig. 3 taken at substantially right angles to the section of Fig. 2; Fig. 4 is a top plan view; Figs. 5 and 6 are sectional views substantially along the lines 5—5 and 6—6 of Fig. 3; Fig. 7 is a view partly in elevation and partly in section, showing a modification wherein the separator is eliminated and the bottom rest holds the lower ends of the plates a predetermined distance apart; Fig. 8 is a transverse sectional view substantially along the line 8—8 of Fig. 7; and Fig. 9 is a perspective view of the bottom rest of Figs. 7 and 8.

The improved cell includes a jar or container 10 of insulating material, preferably glass. The top of the container is threaded and receives a cover 11 preferably formed of hard rubber which is threaded internally and adapted to be screwed down onto the threaded top of the container. Fitted into the under side of and extending entirely across the cover 11 is a disk 12 of relatively soft rubber which serves the double function of a gasket when the cover is screwed down onto the top of the container and also as a seal for the terminals of the plates.

Inside the container 10 are a pair of plates 13, one positive and one negative, these plates having terminals or terminal posts 14 which extend up through aligned openings in the top of the cover and combined gasket and sealing disk 12, being tightly fitted in the latter so that leakage of acid around the terminals is prevented.

In the embodiment shown in Figs. 1 to 6, the plates 13 are spaced apart by a separator 15, preferably a threaded rubber separator.

At the bottom of the container is a bottom rest 16 for the plates 12 and separator 14, this bottom rest in the preferred construction being like that shown in the Norberg application and consisting of a ring or annulus of hard rubber or equivalent insulating material notched out at diametrically opposite points, as shown at 16$^a$ to receive the lower ends of the plates of the separator, the middle of the notch being somewhat deeper than the side portion so that the separator will extend down below the plates. Inasmuch as the plates are set down into notches of the bottom rest, the lower ends of the plates are prevented from spreading or "fanning" at the bottom. If desired, the lower ends of the plates and separator may be fastened to the bottom rest by gutta percha or other suitable sticky compound so that the cover, plates, separator and bottom rest are in the form of a unit adapted to be assembled outside the jar and then to be extended into the latter and the cover screwed into place by turning the unit until the disk 12 is tightly clamped between the cover and top of the jar forming a seal against leakage of acid.

In Figs. 7, 8 and 9 I have shown a modification wherein the separator is eliminated and the bottom rest here designated 17 holds the plates apart at the bottom as well as prevents their spreading. In this instance the bottom rest is notched to receive the lower ends of the plates and has upstanding projections 17$^a$ between the plates, these projections serving to hold the lower ends of the plates a predetermined distance apart.

Though this last mentioned construction is somewhat cheaper than the first, since the separator is eliminated, at the present time I prefer to employ the separator for the latter admits of the plates being placed somewhat closer together and therefore for a given size of jar or container the plates can be made wider since they are located somewhat nearer the diametrical plane.

A further improvement resides in the vent plug which is shown at 18. In this instance the vent plug which may be, and preferably is formed of rubber, is slightly tapered, and extends through an opening in the cover 11, and is seated in an aligned opening in the combined gasket and sealing disk 12. The bottom of the plug has a small opening 18ª, and this leads into a cavity 18ᵇ which is open at the top of the plug extending nearly the full length thereof and gradually flares or enlarges from the opening 18ª to the top of the plug. With this construction very little acid is carried through the plug to the outside of the cell for the minute gas bubbles attach themselves to the wall surrounding the small opening 18ª, and as they rise, they gradually spread in traveling up the flaring cavity 18ᵇ and break before reaching the top thereof, the acid then running back into the cell.

Having described my invention, I claim—

1. A storage battery comprising a jar or container containing positive and negative plates having upstanding terminals, and a cover for the jar adapted to be secured upon the jar or detached therefrom by a rotative movement and having on the under side a combined gasket and sealing disk extending across the same and adaptel to be clamped between the cover and top of the jar through which the terminals extend and are tightly fitted, said terminals extending through openings in the cover and said plates being rotatable with the cover to permit the cover to be attached or detached.

2. A storage battery comprising a jar containing positive and negative plates with upstanding terminals and having a cover adapted to be secured to the top of the jar or to be detached therefrom by a rotative movement and provided on the under side with a rubber disk extending across the same and adapted to be clamped between the cover and top of the jar through which the terminals extend and are fitted, said terminals extending through openings in the cover and said plates being rotatable with the cover.

3. A storage battery comprising a jar containing positive and negative plates having upstanding terminals, and a cover adapted to be screwed onto the top of the jar, said cover having on the under side a combined gasket and sealing disk extending across the same, and adapted to be clamped between the cover and top of the jar, the terminals of the plates extending through aligned openings in the cover and disk and being tightly fitted in said disk.

4. A storage battery comprising a container having positive and negative plates with upstanding terminals, a cover for the container comprising an inner member of soft material and an outer member of relatively hard material adapted to clamp the inner member to the top of the container, the terminals extending through both cover members and being tightly sealed in the inner member, and both cover members having aligned filling openings and a closure therefor.

5. A storage battery comprising a container receiving positive and negative plates having upstanding terminals, and a cover for the container composed of an inner soft member and an outer hard member which clamps the former to the top of the container, the terminals extending through both cover members and being tightly sealed in the inner member, the two cover members having normally open vent openings and having normally closed aligned filling openings.

In testimony whereof, I hereunto affix my signature.

OSCAR W. A. OETTING.